United States Patent
Guan (10) Patent No.: US 10,564,803 B2
(45) Date of Patent: Feb. 18, 2020

(54) SELECTING APPLICATION THAT CAN HANDLE DATA CONTENT

(71) Applicant: Samsung Electronics Co., Ltd, Suwon-si (KR)

(72) Inventor: Haihui Guan, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 15/241,017

(22) Filed: Aug. 18, 2016

(65) Prior Publication Data
US 2018/0052586 A1    Feb. 22, 2018

(51) Int. Cl.
G06F 3/048    (2013.01)
G06F 3/0481   (2013.01)
G06F 3/0482   (2013.01)

(52) U.S. Cl.
CPC ........ G06F 3/04817 (2013.01); G06F 3/0482 (2013.01)

(58) Field of Classification Search
CPC .......................... G06F 3/04817; G06F 3/0482
USPC ................................................. 715/739, 814
See application file for complete search history.

(56) References Cited

U.S. PATENT DOCUMENTS

| | | | |
|---|---|---|---|
| 7,788,588 B2 | 8/2010 | McKee et al. | |
| 8,639,733 B2 | 1/2014 | Holden et al. | |
| 2008/0189627 A1 | 8/2008 | Nikitin et al. | |
| 2009/0077497 A1* | 3/2009 | Cho | G06F 3/04817 715/814 |
| 2011/0102324 A1 | 5/2011 | Hwang | |
| 2014/0325430 A1 | 10/2014 | Vranjes et al. | |

OTHER PUBLICATIONS

Win 10 (Microsoft Windows 10 Enterprise N 2016; Build No. 10.0.14393, the first preview was released on Dec. 16, 2015. The final release was made available to Windows Insiders on Jul. 18, 2016.) pp. 6. (Year: 2016).*

* cited by examiner

Primary Examiner — Andrey Belousov (57) ABSTRACT

An apparatus, method, and computer readable medium for selecting and changing a default compatible application when opening data content not readable by the currently running application. The apparatus includes a memory and at least one processor. The at least one processor is coupled to the memory. The at least one processor is configured to receive a request to handle data content. The at least one processor is also configured to determine a first application selected from a plurality of applications that can handle the data content. The at least one processor is further configured to launch the first application to handle the data content.

20 Claims, 5 Drawing Sheets

SELECTING APPLICATION THAT CAN HANDLE DATA CONTENT

TECHNICAL FIELD

This disclosure relates generally to changing a default application while in the progress of activating. More specifically, this disclosure relates to a system and method for selecting and changing a default application for an application specific link or data.

BACKGROUND

Use of mobile electronic devices is pervasive. Users regularly rely on mobile devices to perform complicated tasks including using different types of data and links with various applications. Some applications cannot handle certain types of data or links

SUMMARY

This disclosure provides a system and method for selecting and changing a default application for an application specific link or data.

In a first embodiment, an apparatus is provided for selecting and changing a default application for an application specific link or data. The apparatus includes a memory and at least one processor. The at least one processor is coupled to the memory. The at least one processor is configured to receive a request to handle data content. The at least one processor is also configured to determine a first application selected from a plurality of applications that can handle the data content. The at least one processor is further configured to launch the first application to handle the data content.

In a second embodiment, a method for selecting and changing a default application for an application specific link or data. The method includes receiving a request to handle data content. The method also includes determining a first application selected from a plurality of applications that can handle the data content. The method further includes launching the first application to handle the data content.

In a third embodiment, a non-transitory medium embodying a computer program is provided for selecting and changing a default application for an application specific link or data. The non-transitory medium causes the computer program to receive a request to handle data content. The non-transitory medium also causes the computer program to determine a first application selected from a plurality of applications that can handle the data content. The non-transitory medium further causes the computer program to launch the first application to handle the data content.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

One or more embodiments of the present disclosure recognize that when an application is launching another application to process the content, often time there are multiple application are registered to handle the type of data. Instead of prompting the user to select the application to launch, the one or more embodiments of the present disclosure use a method to intelligently select the application to be launched, and provides a way for the user to easily switch to other choices thereafter.

Many operating systems allow applications to register to be associated with specific file types, uniform resource identifier (URI) types, web links or some other IDs. For example, current operating systems prompt the user to select an application from a list and optionally provide a method for setting the application as a default. This solution requires the user to find the settings in the system configuration settings, which can be difficult to find or remember. Other operating systems require a selection for an application every time, without an option to remember the choice.

When the system needs to locate an application to be launched to open specific content, the system usually selects one of the applications among those registered for the specific data content, to open the content. The selection is either automatic by the system or manually by the end user. As an example, on the Android operating system, if the user selects to open a PDF file attachment on an email application, the system will choose an available PDF viewer or editor to open the attachment.

Requiring the user to make a selection every time when opening specific content does not provide an optimal user experience. Allowing the system to remember the selection improves the user experience.

Figure 1:
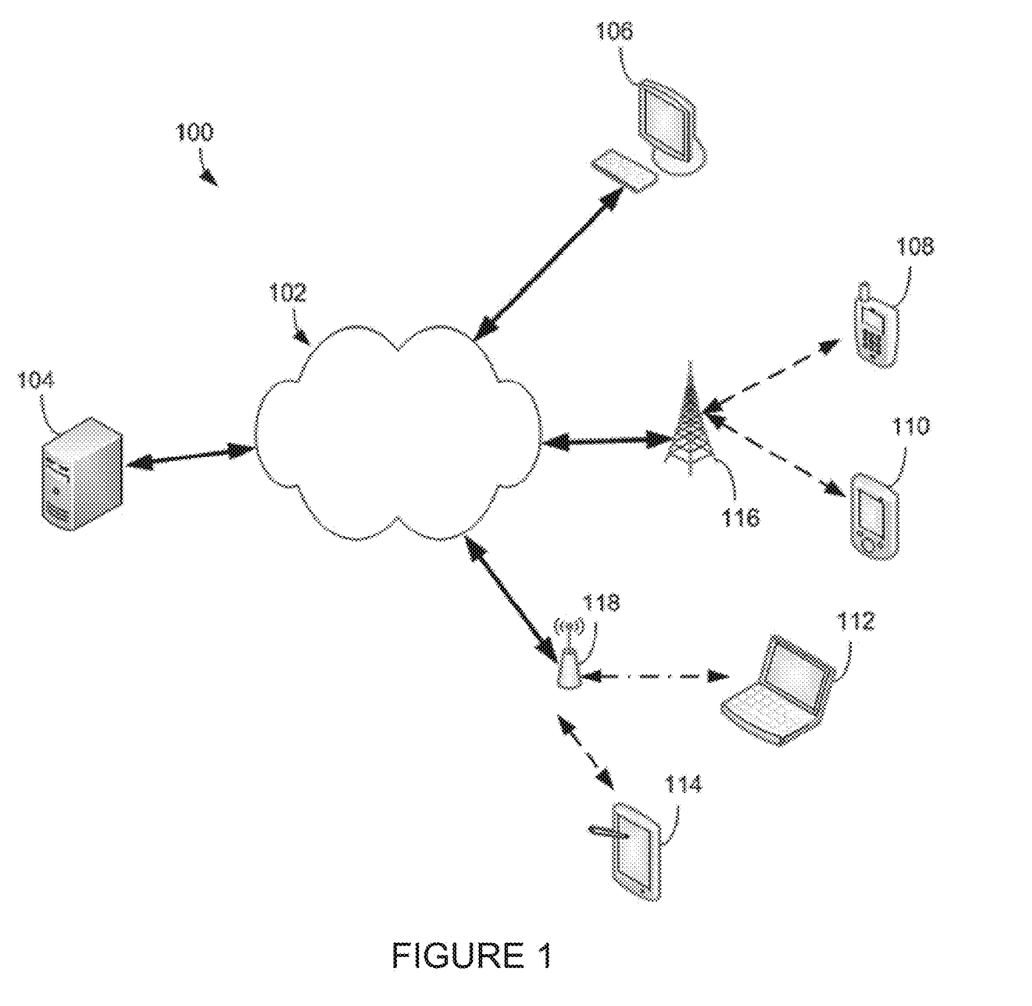
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various client devices 106-114. Each server 104 includes any suitable computing or processing device that can provide computing services for one or more client devices. Each server 104 could, for example, include one or more processors, one or more memories storing instructions and data, and one or more network interfaces facilitating communication over the network 102.

Each client device 106-114 represents any suitable computing or communication device that interacts with at least one server or other computing device(s) over the network 102. In this example, the client devices 106-114 include electronic devices, such as, for example, a desktop computer 106, a mobile telephones or smartphones 108, a personal digital assistant (PDA) 110, a laptop computer 112, a tablet computer 114, a wearable device, smart watch, etc. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points (APs) 118, such as IEEE 802.11 wireless APs, Bluetooth, and Wifi direct. Note that these are for illustration only and that each client device could communicate directly with the network 102 or indirectly with the network 102 via any suitable intermediate device(s) or network(s).

As described in more detail below, when a current application contains data content not readable by the current application, the system launches a default application from a list of application compatible with the data content.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
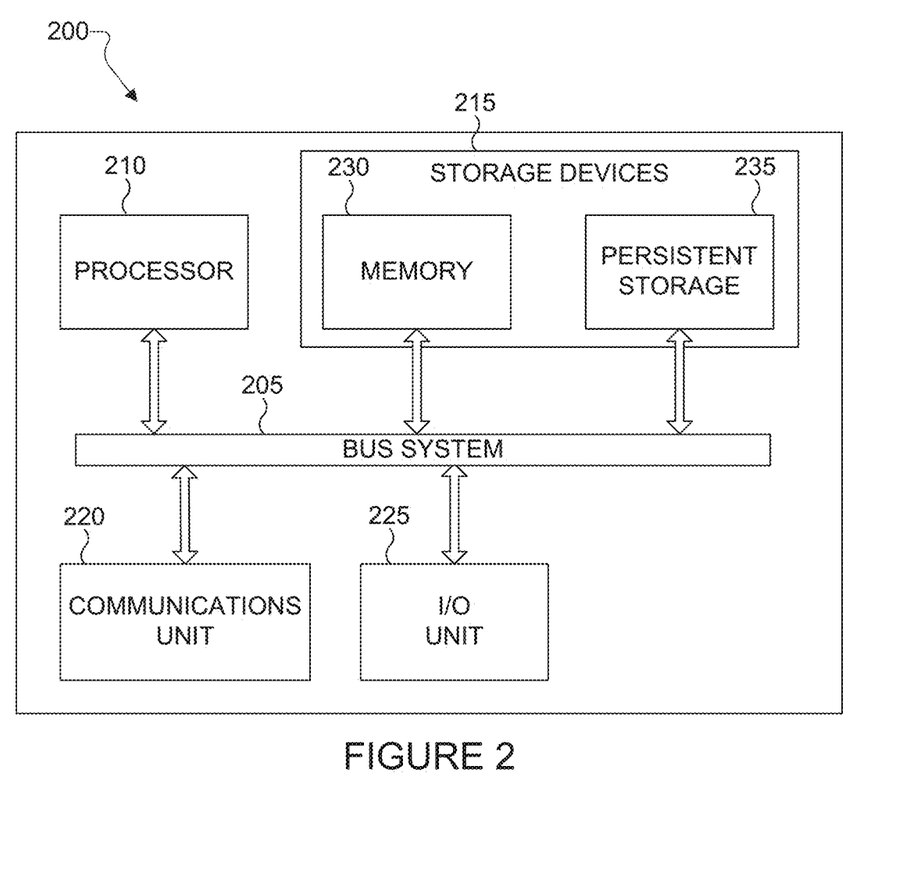
FIG. 2 illustrates an example server according to various embodiments of the present disclosure.
Figure 3:
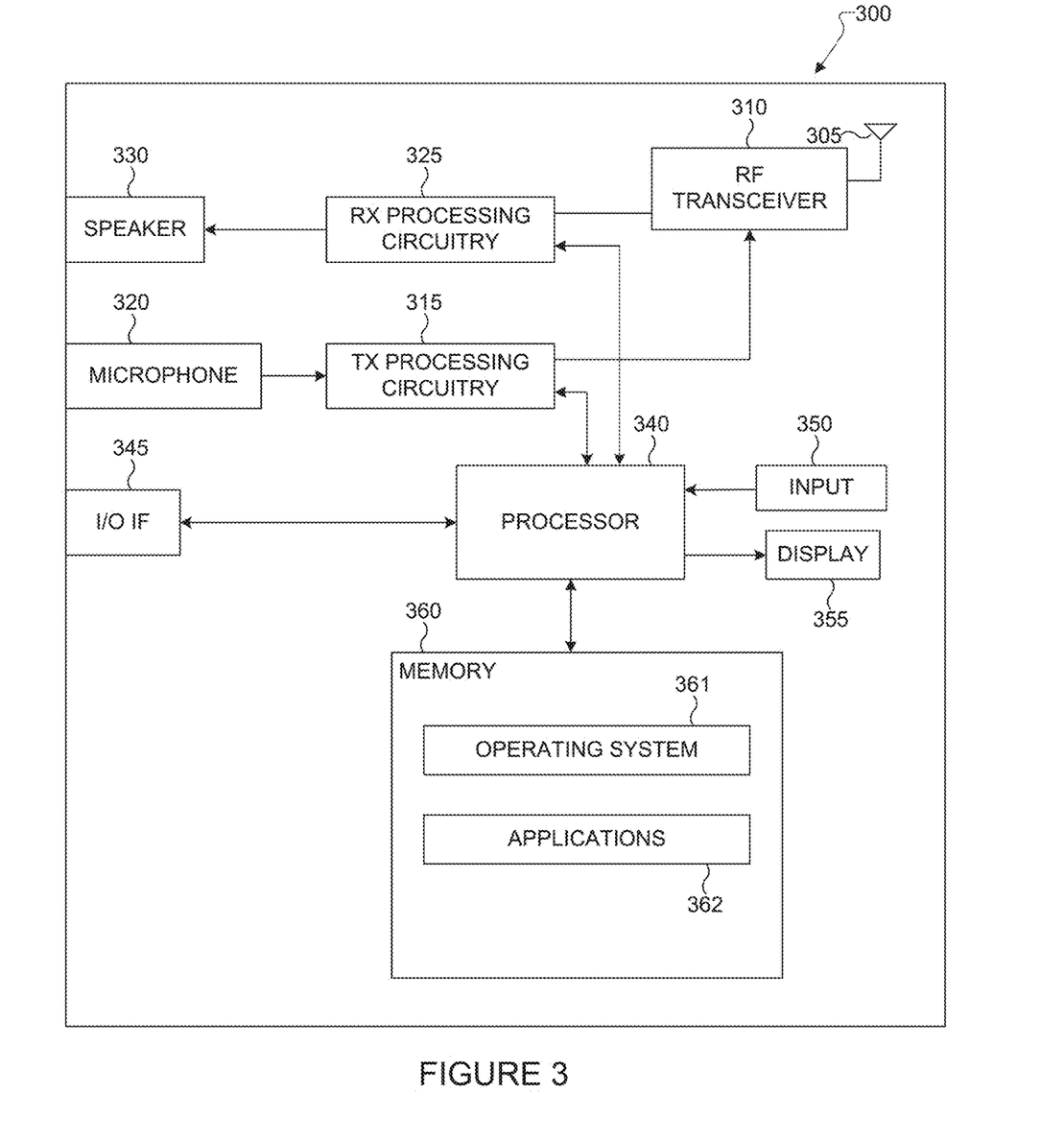
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As described in more detail below, when a current application contains data content not readable by the current application, the system launches a default application from a list of application compatible with the data content. For example, any one of the client devices 108-114 may identify and launch the default application from a list of application compatible with the data content.

As shown in FIG. 3, the electronic device 300 includes an antenna 305, a radio frequency (RF) transceiver 310, transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processors and execute the OS program 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, when a current application (e.g., one of applications 362) contains or attempts to access data content not readable by the current application, the electronic device 300 launches a default application (e.g., another one of applications 362) from a list of application in applications 362 that are compatible with the data content.

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4A:
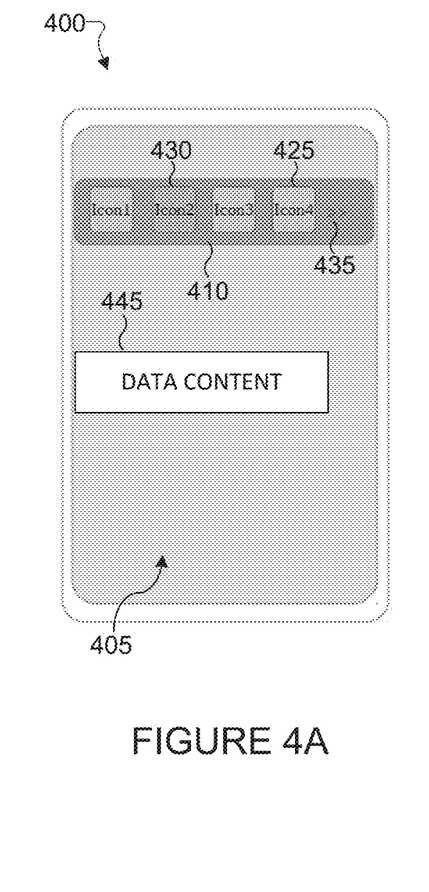
FIG. 4A illustrates an example electronic device displaying a scrollable toolbar for activating a default application for opening application specific data content according to a various embodiments of the present disclosure.
Figure 4B:
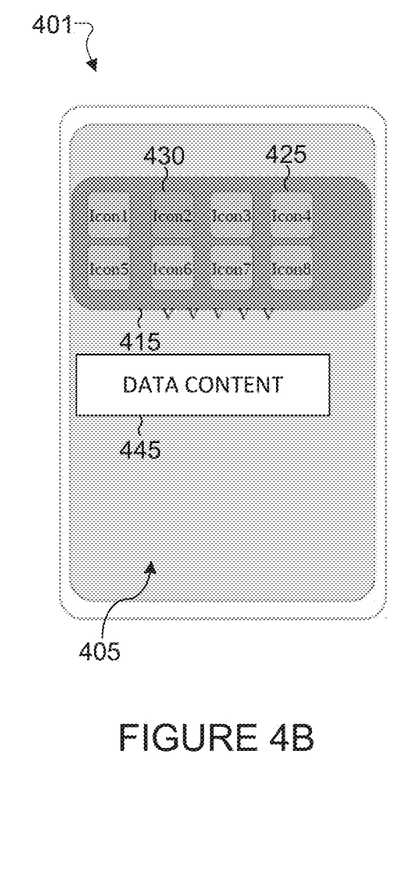
FIG. 4B illustrates an example electronic device displaying an extended toolbar for activating a default application for opening application specific data content according to a various embodiments of the present disclosure.
Figure 4C:
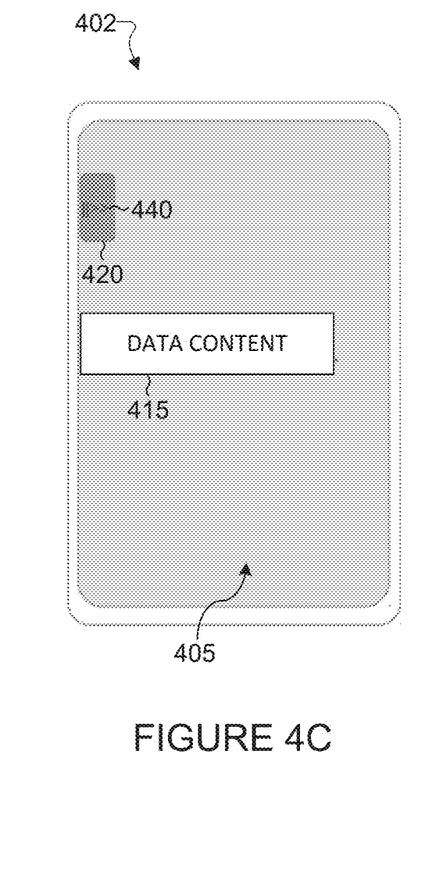
FIG. 4C illustrates an example electronic device displaying a collapsible toolbar for activating a default application for opening application specific data content according to a various embodiments of the present disclosure.

FIGS. 4A, 4B and 4C illustrate example displays 400, 401 and 402 activating a default application for opening application specific data content 445 according to this disclosure. The embodiment of the displays 400, 401 and 402 illustrated in FIGS. 4A-4C is for illustration only. FIGS. 4A-4C do not limit the scope of this disclosure to any particular implementation of an electronic device. FIG. 4A illustrates a display 400 with a scrollable toolbar 410. FIG. 4B illustrates a display 401 with an extended toolbar 415. FIG. 4C illustrates a collapsible toolbar 420.

The display 400, 401, 402 includes a running application 405. The running application 405 includes data content 445, which can be, e.g., an application specific link or data, specific file types, uniform resource identifier (URI) types, web links or other IDs, which is not readable by the running application 405. When the data content 445 is selected, the running application 405 passes the data content 445 to the system and asks the system to find a compatible application 425. The system determines a list of compatible applications 425 for the application specific link or data. In certain embodiments, the system keeps a registry of data types that are manageable by the compatible applications 425 when an application is originally installed. These compatible applications 425 can be stored in a registry of the system. In other embodiments, the system can search through applications previously installed for compatible applications 425, which can also be stored in a registry.

The system displays a scrollable toolbar 410 on the display 400. The scrollable toolbar 410 also includes a scroll button 435. The scroll button 435 allows the user to view the remaining compatible applications 425 over the amount available to display.

The display 401 illustrates an extended toolbar 415. The extended toolbar 415 expands to display multiple rows of icons for compatible icons 425. The extended toolbar 415 can be extended automatically by the system or by the user. When the user extends the toolbar, the icons of the compatible applications 425 change size based on the amount of compatible applications 425 and the size of the extended toolbar 415. The size of the extended toolbar 415 can be reset to a default size each time the extend toolbar is open or the extended toolbar 415 can be the size the user adjusted side from the previous time the extended toolbar 415 was opened.

The display 402 illustrates a collapsible toolbar 420. The collapsible toolbar 420 includes an extendable/collapsible button 440. The extendable/collapsible button 440 extends or collapses the collapsible toolbar 420. When the collapsible toolbar 420 is in the collapsed state, the default application 430 can still be visible in various embodiments. The collapsible toolbar 440 can start in a collapsed or expanded state. The collapsible toolbar 440 can be changed with the extendable/collapsible button 420 as well as with different user gestures.

The toolbar 410, 415, 420 can be displayed at a designated part of the display 400, 401, 402. The toolbar 410, 415, 420 can also be displayed on a portion of the display 400, 401, 402 that does not obstruct parts of the running application 405. The toolbar 410, 415, 420 can have the icons laid out in a linear progression, circular progression. When more compatible applications 425 are available to be shown in the designated area, a specific gesture can be made to the phone to navigate between the compatible applications 425.

The toolbar 410, 415, 420 can display a number of icons for compatible application 425. In certain embodiments, four icons for compatible applications 425 are displayed in the toolbar 410, 415, 420. The toolbar 410, 415, 420 can indicate a default application 430. The default application 430 can be indicated in a different color, change in size, first in order, or even a displayed outside the toolbar 410, 415, 420. The compatible applications 425 can be order in the toolbar 410, 415, 420 in any manner, such as popularity, alphabetically, general usage of the compatible application, usage for the specific type of data content 445, amount of memory required to open the data content 445 using the compatible application 425, amount of time required to open the data content 445 using the compatible application 425, amount of time since the compatible application 425 was run, the amount of time since the compatible application 425 was used to manage the data content 445, based on reviews of the compatible applications 425, relevancy upon the environment the compatible application 425 is launched in, or based on the content. The default application 430 can follow order used for the toolbar 410, 415, 420 or can be displayed in a primary position regardless of the ordering of the other compatible applications 425.

Figure 5:
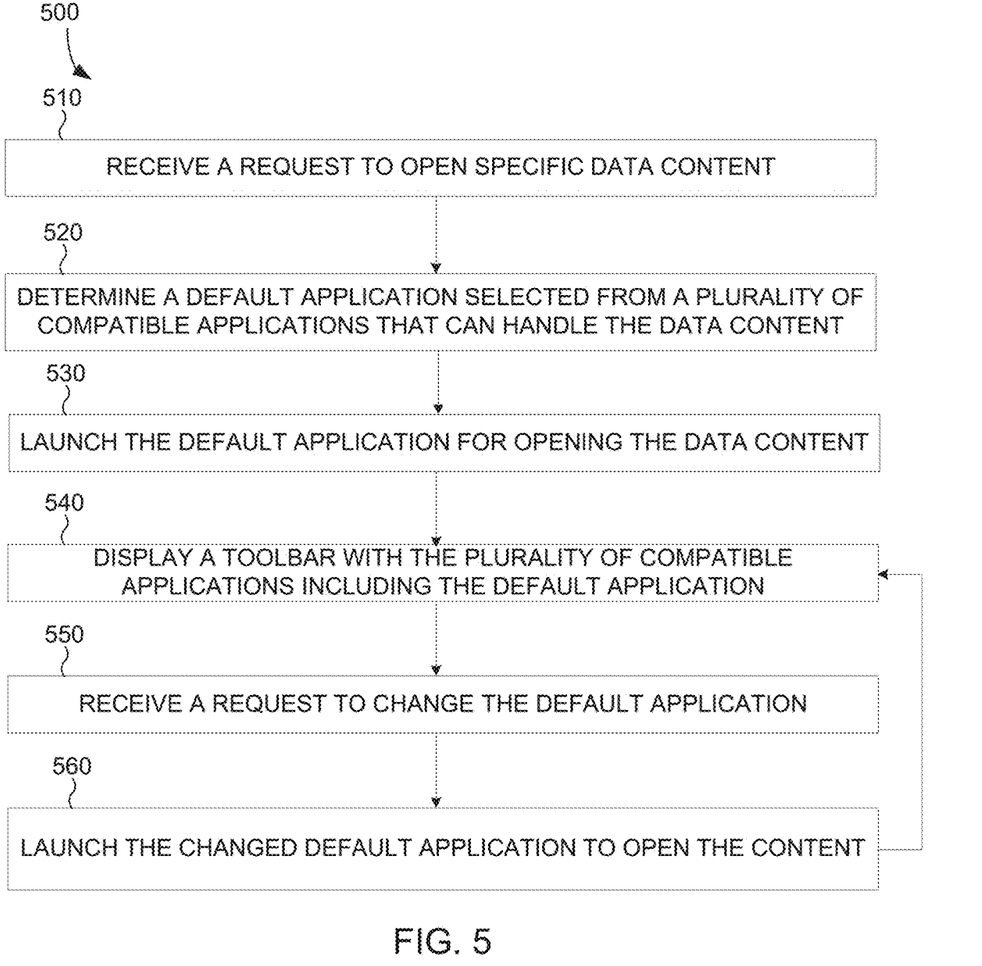
FIG. 5 illustrates an example process for selecting and changing a default application for an application link or data according to this disclosure.

FIG. 5 illustrates an example process 500 for selecting and changing a default application for an application link or data according to this disclosure. For example, the process depicted in FIG. 5 may be performed by electronic device 300 in FIG. 3; the process may also be implemented by client devices 106-114 in FIG. 1, referred to hereinafter collectively or individually, as "the system."

In operation 510, the system receives a request to open specific data content 445. The request can be received through a selection of a link or selection of data. In certain embodiments, a running application 405 contains data content 445 that is not readable by the running application 405.

In operation 520, the system determines a default application 430 selected from a plurality of compatible applications 425 that can handle the data content 445. Handling the data content means, for example, accessing, opening, or reading the data content. The system can store a list of compatible applications 425 by a media type in a registry. When an application is installed on the system, the media types of data content 445 that are manageable by the application are recorded in the registry. In certain embodiments, the system can search through applications already installed to create a registry of media types of data content 445 that are manageable by each application.

In operation 530, the system launches the default application 430 for opening the data content. The default applications 430 can be selected in any manner, such as most generally used compatible application 425, most used compatible application 425 for the specific type of data content 445, least amount of memory required to open the data content 445 of the compatible applications 425, least amount of time required to open the data content 445 of the compatible applications 425, most recent compatible application 425 that was run, most recent compatible application 425 used to manage the data content 445, most popular compatible application 425 based on reviews of the compatible applications 425, most appropriate application 425 to launch based upon the context or environment, or any other method of choosing a default application.

In operation 540, the system displays a toolbar 410, 415, 420 with the plurality of compatible applications 425 including the default application 430. The toolbar 410, 415, 420 can be displayed at a designated part of the display 400. The toolbar 410, 415, 420 can also be displayed on a portion of the display 400 that does not obstruct parts of the running application 405. The toolbar 410, 415, 420 can have the icons laid out in a linear progression, circular progression. When more compatible applications 425 are available to be shown in the designated area, a specific gesture can be made to the phone to navigate between the compatible applications 425.

The toolbar 410, 415, 420 can display a number of icons for compatible application 425. In certain embodiments, four icons for compatible applications 425 are displayed in the toolbar 410, 415, 420. The toolbar 410, 415, 420 can indicate a default application 430. The default application 430 can be indicated in a different color, change in size, first in order, or even a displayed outside the toolbar 410, 415, 420. The compatible applications 425 can be order in the toolbar 410, 415, 420 in any manner, such as popularity, alphabetically, general usage of the compatible application, usage for the specific type of data content 445, amount of memory required to open the data content 445 using the compatible application 425, amount of time required to open the data content 445 using the compatible application 425, amount of time since the compatible application 425 was run, the amount of time since the compatible application 425 was used to manage the data content 445, based on reviews of the compatible applications 425, relevancy upon the environment the compatible application 425 is launched in, or based on the content. The default application 430 can follow order used for the toolbar 410, 415, 420 or can be displayed in a primary position regardless of the ordering of the other compatible applications 425.

In operation 550, the system receives a request to change the default application 430. The request can be a user input selecting an icon of one of the compatible applications 425 including a click or other gesture. The system runs the alternate compatible application 425 that is selected by the user to manage the data content 445. Based on the method of picking a default application 430, the alternate compatible application 425 can be defined as the new default application 430.

In certain embodiments, a combination of ordering methods can be used to determine the following default application 430. For example, the first time a user attempts to open a specific type of data content 445, the system might use the chosen ordering of the compatible applications 425 and the selection of the default application 430. But a different method of ordering the compatible applications 425 is used on all subsequent attempts to open the same type of data content 445. For example, the first time might order the compatible applications ordering by the application install date and every subsequent time the ordering could be based on amount of time since the compatible application 425 was last used to open the specific data content 445. In certain embodiments, a multi-level ordering of the compatible applications 425 is used to determine ordering of applications with similar ordering values. For example, if the compatible applications are ordered based on the application rating from the application store, two compatible applications 425 with a similar rating could be further ordered based on amount of ratings or downloads of a particular compatible application 425

In certain embodiments, the system does not receive a request to change the default program and runs the default program 430. The system can delay or wait to start the default program 430 for a limited amount of time or receiving a gesture to indicate that the default program 430 is to be used. When the gesture indicating the default program 430 is to be used, the system removes the display of the toolbar and the icons.

In operation 560, the system launches the changed default application 430 and stop displaying the toolbar 410, 415, 420. The changed default application 430 is used to manage the data content 445. The toolbar 410, 415, 420 may no longer displayed once the changed default application is opened to manage the data content 445, or the toolbar 410, 415, 420 may continue to display allowing the repeated input to change the default application 430, only to disappear after a specified period time period. When the toolbar 410, 415, 420 receives an input to change the default application 430, the new default application 430 is highlighted or indicated as the default application 430 on the toolbar 410, 415, 420. The toolbar 410, 415, 420 can be reordered accordingly whenever a new default application 430 is selected. The toolbar 410, 415, 420 disappears after a time period without receiving a new input to change the default application 430.

Although FIG. 5 illustrate examples of processes for selecting and changing a default application for an application link or data, respectively, various changes could be made to FIG. 5. For example, while shown as a series of steps, various steps could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus, comprising:
a memory;
at least one processor, coupled to the memory; and
a display, coupled to the at least one processor, wherein the at least one processor is configured to:
store, in the memory, application usage statistics;
operate a running application containing data content unreadable by the running application;
receive a request from the running application to handle the data content when the data content is selected;
determine a plurality of compatible applications that are compatible to handle the data content, wherein handling the data content includes reading the data content;
output, to the display, an icon for each of the plurality of compatible applications in a toolbar;
launch a first application automatically based on the application usage statistics from the plurality of compatible applications in the toolbar to handle the data content, wherein after launching the first application, the processor continuously displays the toolbar until a time period has elapsed without receiving a selection to launch another application that is different from the first application; and
responsive to the time period elapsing, no longer display the toolbar.

2. The apparatus of claim 1, wherein the the application usage statistics includes at least one of:
a most generally used application,
a most used application for a specific type of data content,
a least amount of memory required to open the data content of the plurality of compatible applications,
a least amount of time required to open the data content of the plurality of compatible applications, a most recent application that was run,
a most recent application used to manage the data content,
a most popular application content based on reviews of the plurality of compatible applications that can handle the data content, or
a most appropriate application to launch based upon a context or an environment.

3. The apparatus of claim 1, wherein the at least one processor is further configured to display a visual effect on an icon for the first application.

4. The apparatus of claim 3, wherein to launch the first application the at least one processor is configured to:
receive a gesture not related to the display of the plurality of compatible applications; and
remove the display of the icon for each of the plurality of compatible applications.

5. The apparatus of claim 1, wherein the at least one processor is further configured to:

store, in the memory, a registry of applications that can handle different media types of data; and match the data content to a media type in the registry to determine the plurality of compatible applications.

6. A method comprising:

storing, in a memory, application usage statistics;

operating a running application containing data content unreadable by the running application;

receiving a request from the running application to handle the data content when the data content is selected;

determining a plurality of compatible applications that are compatible to handle the data content, wherein handling the data content includes reading the data content;

displaying an icon for each of the plurality of compatible applications in a toolbar;

launching a first application automatically based on the application usage statistics from the plurality of compatible applications in the toolbar to handle the data content, wherein after launching the first application, continuously displaying the toolbar until a time period has elapsed without receiving a selection to launch another application that is different from the first application; and responsive to the time period elapsing, no longer displaying the toolbar.

7. The method of claim 6, wherein the application usage statistics includes at least one of:

a most generally used application, a most used application for a specific type of data content, a least amount of memory required to open the data content of the plurality of compatible applications, a least amount of time required to open the data content of the plurality of compatible applications, a most recent application that was run, a most recent application used to manage the data content, a most popular application content based on reviews of the plurality of compatible applications that can handle the data content, or a most appropriate application to launch based upon a context or an environment.

8. The method of claim 6, further comprising:

displaying a visual effect on the icon for the first application.

9. The method of claim 8, wherein launching the first application comprises:

receiving a gesture not related to the display of the plurality of compatible applications; and removing the display of the icon for each of the plurality of compatible applications.

10. The method of claim 6, further comprising:

storing a registry of applications that can handle different media types of data; and matching the data content to a media type in the registry to determine the plurality of compatible applications.

11. A non-transitory computer readable medium including a plurality of instructions that, when executed by at least one processor, is configured to cause the at least one processor to:

store, in a memory, application usage statistics;

operate a running application containing data content unreadable by the running application;

receive a request from the running application to handle the data content when the data content is selected;

determine a plurality of compatible applications that are compatible to handle the data content, wherein handling the data content includes reading the data content;

output, to a display, an icon for each of the plurality of compatible applications in a toolbar;

launch a first application automatically based on the application usage statistics from the plurality of compatible applications in the toolbar to handle the data content, wherein after launching the first application, continuously displaying the toolbar until a time period has elapsed without receiving a selection to launch another application that is different from the first application; and responsive to the time period elapsing, no longer display the toolbar.

12. The non-transitory computer readable medium of claim 11, wherein the application usage statistics includes at least one of:

a most generally used application, a most used application for a specific type of data content, a least amount of memory required to open the data content of the plurality of compatible applications, a least amount of time required to open the data content of the plurality of compatible applications, a most recent application that was run, a most recent application used to manage the data content, a most popular application content based on reviews of the plurality of compatible applications that can handle the data content, or a most appropriate application to launch based upon a context or an environment.

13. The non-transitory computer readable medium of claim 11, wherein the plurality of instructions is further configured to cause the at least one processor to display a visual effect on the icon for the first application.

14. The non-transitory computer readable medium of claim 13, wherein the plurality of instructions configured to cause the at least one processor to launch the first application further comprises instructions that cause the at least one processor to:

receive a gesture not related to the display of the plurality of compatible applications; and remove the display of the plurality of compatible applications.

15. The apparatus of claim 1, wherein the toolbar is a collapsible toolbar configured to display an icon for the first application when the collapsible toolbar is in a collapsed state.

16. The method of claim 6, wherein the toolbar is a collapsible toolbar configured to display an icon for the first application when the collapsible toolbar is in a collapsed state.

17. The non-transitory computer readable medium of claim 11, wherein the toolbar is a collapsible toolbar configured to display an icon for the first application when the collapsible toolbar is in a collapsed state.

18. The apparatus of claim 1, wherein the toolbar is an extendable toolbar configured to change a size of the icon for each of the plurality of compatible applications when the extendable toolbar is in an extended state.

19. The method of claim 6, wherein the toolbar is an extendable toolbar configured to change a size of the icon for each of the plurality of compatible applications when the extendable toolbar is in an extended state.

20. The non-transitory computer readable medium of claim 11, wherein the toolbar is an extendable toolbar configured to change a size of the icon for each of the plurality of compatible applications when the extendable toolbar is in an extended state.

\* \* \* \* \*